UNITED STATES PATENT OFFICE.

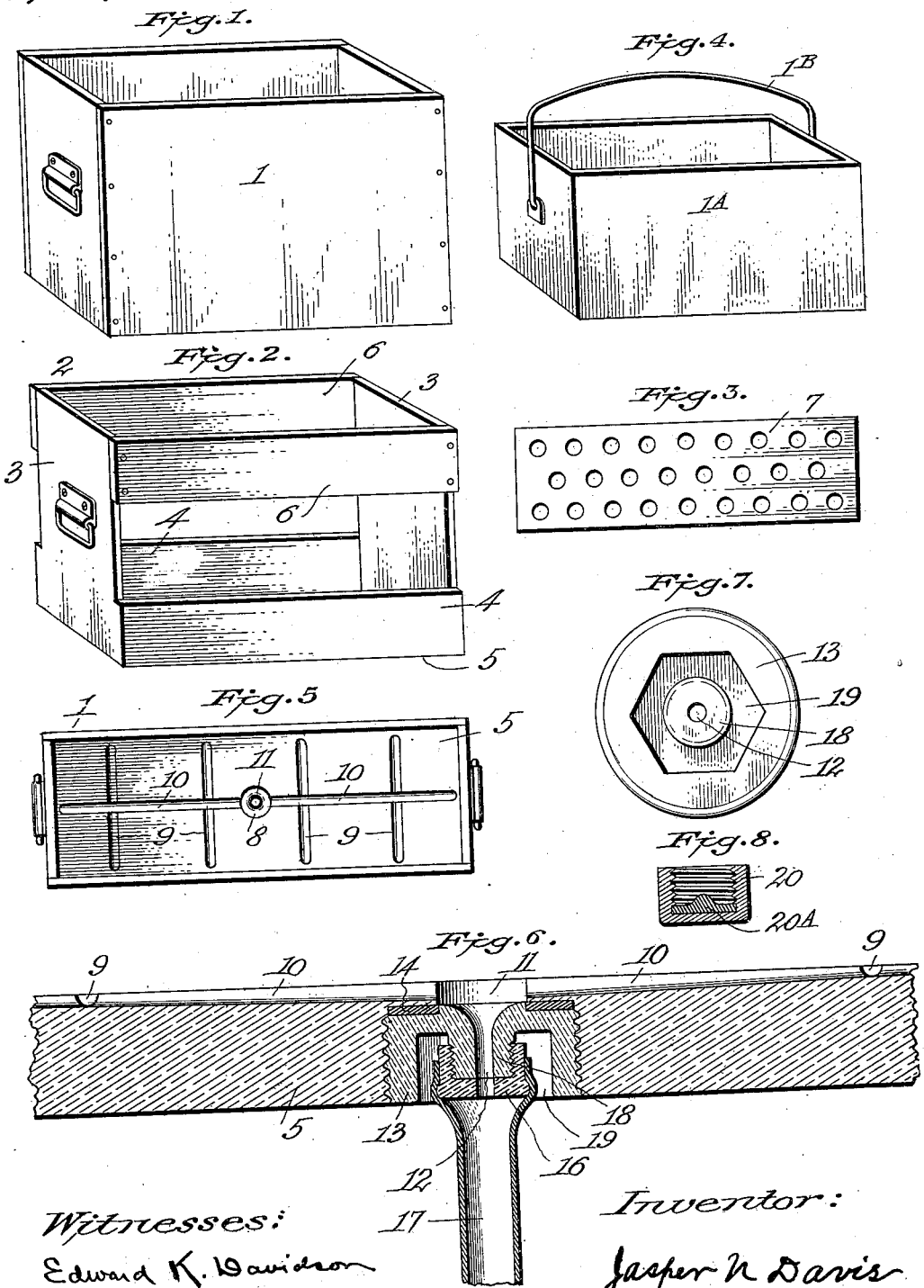

JASPER N. DAVIS, OF DENVER, COLORADO.

BATTERY-TRAY CONNECTION.

1,087,531.   Specification of Letters Patent.   Patented Feb. 17, 1914.

Application filed July 2, 1912. Serial No. 707,377.

*To all whom it may concern:*

Be it known that I, JASPER N. DAVIS, a citizen of the United States of America, residing in the city and county of Denver and State of Colorado, have invented a new and useful Battery-Tray Connection, of which the following is a specification.

My invention relates to improvements in storage battery trays.

The objection to the present construction of storage battery trays or cases, hereafter called "trays," which contains the cells of the batteries used on gasolene automobiles and electric propelled vehicles, on railroad and street railway cars or other places, is the leakage or slopping out of the sulfuric acid or battery solution into the battery trays, which softens, eats away, and decomposes the wood or metal cases of which the trays are made, and also the battery apartments that support the battery in the automobile or elecric vehicle, etc., to such an extent that if new trays and boards under the battery are not replaced, the weight of the battery will cause the cells of the battery to fall through.

In the case of electric vehicles, the acid, which soaks the trays and boards that hold up the trays and the iron supports under the boards or the trays, not only destroys them but causes short circuits from the cells of the battery to the frame work and to the wiring, and often holes are burnt in the rubber jars or cell retainers, letting out the solution in the cell, and injuring all parts in contact with it.

The object of this improvement is to construct special forms of storage battery trays, whereby the acid or battery solution, that may be slopped out of the cells or coming through a broken or defective jar into the battery trays, may be drained to one or more places in the bottoms of said trays to openings through the bottoms, from which it can drop to the ground in clearance of the vehicle chassis, or conveyed in a rubber tube to a place of clearance.

A further object of the improvement is to make the trays out of material that is non-conductive, non-absorptive and sufficiently strong for this purpose. I also claim as a part of my improvement to have the boards that support the battery trays in the electric propelled vehicles or railway cars or motor boats, etc., also made of non-conductive, non-absorptive strong material, for the reason that the acid or solution from the battery is sometimes thrown out of the cells with such force that the trays will not catch it and it falls or runs down on the outside of the trays onto the boards that support the battery on the frame or chassis of the car or vehicle or boat, and if the said boards or supports were not made of non-resisting acid-proof material, they would be destroyed and give way under the weight of the battery.

These improvements in construction and said material, will be fully understood by reference to the accompanying drawings, and which construction consists of non-conductive, non-absorptive, strong acid-resisting material.

Figure 1 shows a perspective view of a battery tray, the ordinary handle being shown on one end of the tray, the two sides having no openings for ventilation. Fig. 2, shows a battery tray, whose two sides have an opening space between the upper and lower portion of the two sides for ventilation. Fig. 3, is a modification showing a perforated slat to fill the place of one of the upper slats and the air space below it, shown in Fig. 2. Fig. 4, is a perspective view of a small sized battery tray and its handle, such as used for ignition and lighting on automobiles and other gas engines. Fig. 5, is a plan view of a battery tray looking down into the tray at the bottom, showing drainage grooves leading to a drain opening through the bottom of the tray. Fig. 6, is a longitudinal sectional view through a portion of the bottom showing the leading collecting groove and a screw plug through which passes the drainage opening through the bottom of a storage battery tray and its apartments and fittings. Fig. 7, is a view of the bottom end portion of the drainage screw plug, as shown in half section in Fig. 6. Fig. 8, is a half sectional view of a cap adapted to screw over the projection in the center of the screw plug shown in Fig. 7, from the underneath end of the plug.

Similar letters of reference refer to similar parts throughout the several views.

Referring to the accompanying drawings, the numeral 1 indicates a rectangular storage battery tray made of non-conductive, non-absorptive, acid-proof strong material. This material may be made from a composition, and when manufactured can be made in any form, such as the ordinary wooden plank or board, or molded in box form, with the two sides, the two ends, and bottom in one integral part. When made out of straight boards, as they are at present being made, the boards may be of a composition manufacture, or the ordinary wood board used but being treated, so as to become practically non-conductive of electricity and non-absorptive of battery solution, such as bakelite impregnated wood or bakelized wood or the ordinary used boards treated with other insulating acid-resisting solutions, such that will make the boards an insulator of electricity and resist any injurious effect of the battery solution.

The tray 1, Fig. 1, is made in board form, and put together by any of the methods commonly used, except the joints are put together with an acid-resisting cement, preventing the battery solution from seeping through.

In Fig. 2, the numeral 2 indicates a battery tray similar in form to tray 1 in Fig. 1, but in different construction. The two ends 3, and the lower portion of the two sides 4, and bottom 5, are made in one integral part. The upper portion of the two sides of tray 2, and the two sides 6, are made detachable, that is, made in board form and can be removed when desired by taking out the screws or other means which secures it to the ends 3. A space is left for ventilation between the lower portion of the two sides 4, and the upper sides 6, which also lessens the cost and weight.

In Fig. 3 is shown a perforated side 7 made to take the place of the two upper sides 6 in Fig. 2, and to inclose the air space left between the upper sides 6 and the lower sides 4. This side 7 can be removed when desired the same as sides 6.

In Fig. 4 is shown a battery tray 1^A constructed the same as is mentioned in the construction of tray shown in Fig. 1. It is of a smaller size, however, and is intended only to be used in ignition and lights on gasolene automobiles or other purposes where a tray is used to contain a battery only of a few cells of a small size, and has a handle 1^B to carry it about, as shown. In these small size trays, it is preferred to make the sides, ends, and bottom in one integral part, from a composition of material which is a non-conductor of electricity and non-absorptive of moisture, or penetrative of acid or other solution from any make of storage batteries.

In Fig. 5 is shown a plan view of the interior bottoms of the storage battery trays shown in Figs. 1, 2 and 4.

In these improved storage battery trays, of which the two sides, or at least the lower portion of the two sides, the two ends and the bottoms are so constructed as to make the joints absolutely tight by the use of an insulating acid-resisting cement, or are made in one integral part, it is necessary to have one or more openings or outlets through the bottom of the trays for any waste solution from any of the cells in the tray to pass out of the tray, and there should be also drainage grooves distributed over the interior bottom of the trays to drain said waste of solution to the openings or outlets. These are shown in Fig. 5, where is shown only one opening at 8, and drainage grooves are shown at 9 and 10.

There are places where storage batteries are installed, such as electrically propelled boats, where it is necessary that no battery solution drop on the iron or frame supports under the battery, which would weaken the supports to the boat and would be more hazardous than on a vehicle, and the solution should be conveyed in rubber tubing to a place or vat to receive the waste battery solution. This will be understood from Fig. 6, where is shown a sectional view of a tray bottom through the main collecting drainage groove 10—10 in Fig. 5, and through the opening 8.

It can be seen and understood from Fig. 6 that the drainage grooves are shallow and start from the surface at their utmost extremities, and increase in depth as they approach the opening through the tray bottom. The opening is flared out and larger at the inner surface of the bottom, at the junction of the drainage grooves, marked 11, and continues into a smaller hole 12, which passes through the bottom of the tray, as shown. This hole passing through the tray bottom, is shown to pass through a plug 13 screwed into the bottom of the tray from the underneath portion of the tray bottom proper. A rubber gasket 14 is placed around and over the head of the plug to make a tight fit and practically seal the division between the tray bottom and the head of the plug leading to the thread portion of the plug and the tray bottom. This is to avoid any seeping through of the battery solution to the underneath surface of the tray bottom 5, which might thereby come in contact with some part of the battery apartment. A cap 16, adapted to receive a rubber tube 17 over its outer end, is shown to be screwed over a projection 18 coming from the center of the plug 13, through which the hole 12 of the tray bottom passes, allowing the battery solution which accumulates in the bottom of the tray from sloppage or a leaky battery jar, to drain out of the tray through the opening 12 and tube 17, to a vat or place of clearance. A recess 19 is shown to extend around the projection 18 and between the threaded wall of the plug 13, allowing ample space for the cap 16 to be screwed over the projection 18.

In Fig. 7 is shown a bottom view of the screw plug 13 of Fig. 6, and the recess 19 adapted to fit a standard hexagon wrench to screw the plug in or out. In the center is the threaded projection 18, through which passes the opening 12.

In electric pleasure vehicles, trucks and street railway cars, it would not be necessary to have the same construction of a drainage plug as is shown in Figs. 6 and 7, adapted to receive a threaded cap and a rubber hose, as would be required in the cases above mentioned, for the reason that the waste battery solution can be drained from the battery trays to any one or more places in the bottom of the tray, where it can drop to the ground in clearance of any rods, axles, or other parts of the vehicle or car, and all that is required in the construction of the tray is the recess 11 and recess 19 in Fig. 6, and projection 18 and the opening 12. The recess 19 and the projection 18 are necessary in order for the battery solution to drop to the ground, which otherwise would follow along the underneath bottom of the tray 15 in Fig. 6, and drain off on parts that would be injured. It is intended where these drainage openings come, that the boards on which the trays are supported have large holes bored in them, giving clearance for the acid or battery solution to drop to the ground.

In ignition and electric light storage battery trays, as shown in Fig. 4, a plug with a threaded projection, as shown in Fig. 6 at 18, and the recess 19, are necessary. The object is, while the battery is in use and being held in its place in a special made wooden or metal box on the running board or under the seat of an automobile, the said waste acid or battery solution can be held in the battery tray by a cap 20, of which a half section is shown in Fig. 8, screwed over the projection 18, as shown in Fig. 6. The rubber washer 20$^A$, as is shown inside the cap in Fig. 8, closes the opening through the tray bottom, as shown at 12 in Fig. 6. When the battery is removed from the automobile, to be charged, the cap can be removed if desired, to ascertain if the battery jars are all right and none of them leaking.

Having described my invention, what I claim as new and desire to secure by Letters Patent, is:

A battery tray having a central aperture extending through its bottom and terminating in a threaded socket of greater diameter than said aperture, thereby forming a shoulder; a plug threaded in said socket and adapted to coöperate with said shoulder, and having a depending threaded nipple and a surrounding wrench receiving recess; a drain hole formed through said plug and its nipple and a cap within said recess and mounted on said nipple, and adapted to receive a discharge member.

JASPER N. DAVIS.

Witnesses:
 EDWARD K. DAVIDSON,
 W. T. HOPPER.

---

Copies of this patent may be obtained for five cents each, by addressing the "Commissioner of Patents, Washington, D. C."